(12) United States Patent
Varma et al.

(10) Patent No.: US 8,060,852 B1
(45) Date of Patent: Nov. 15, 2011

(54) METHOD AND SYSTEM FOR SCREENING NETS IN A POST-LAYOUT ENVIRONMENT

(75) Inventors: Ambrish Varma, Nashua, NH (US); Feras Al-Hawari, Hudson, NH (US); Kumar Keshavan, Medford, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 385 days.

(21) Appl. No.: 12/490,158

(22) Filed: Jun. 23, 2009

(51) Int. Cl.
*G06F 17/50* (2006.01)
(52) U.S. Cl. ........ 716/136; 716/106; 716/107; 716/108; 716/110; 716/111; 716/113; 716/115; 716/134; 703/2; 703/3; 703/4; 703/13; 703/14
(58) Field of Classification Search .......... 716/106–108, 716/110–111, 113, 115, 134, 136; 703/2–4, 703/13–19, 23
See application file for complete search history.

(56) References Cited

U.S. PATENT DOCUMENTS

| | | | | |
|---|---|---|---|---|
| 5,390,193 A * | 2/1995 | Millman et al. | .............. | 714/741 |
| 6,744,262 B2 * | 6/2004 | Adamian | ...................... | 324/638 |
| 7,120,890 B2 * | 10/2006 | Urata et al. | ................... | 716/108 |
| 7,506,283 B2 * | 3/2009 | Bailey et al. | ................... | 716/136 |

OTHER PUBLICATIONS

"Cadence OrCAD Signal Explorer Signal Integrity Technology"; http://www.cadence.com/rl/Resources/datasheets/pcb_signal_integrity_ds.pdf; Cadence Design Systems, Inc. 2008; 3 pages.
Foster; "Anatomy of an Eye Diagram—a Primer"; http://www.bertscope.com/Literature/White_Papers/Eye_Anatomy.pdf; SyntheSys Research, Inc.; 2004; 8 pages.
"Agilent—Correlation of Simulation versus Measurement in Frequency and Time Domain"; http://cp.literature.agilent.com/litweb/pdf/5989-1940EN.pdf; Cadence Design Systems, Inc. and Agilent Technologies, Inc.; Dec. 6, 2004; 20 pages.
"Signal Integrity Comparisons Between Stratix II and Virtex-4 FPGAs"; http://www.altera.com/literature/wp/signal-integrity_s2-v4.pdf; Altera Corporation; Mar. 2005; 10 pages.
Telian, D., et al.; "New Serial Link Simulation Process, 6 Gbps SAS Case Study"; DesignCon 2009; http://www.siguys.com/resources/2009_DesignCon_6Gbps_Simulation_Paper.pdf; 2009; 25 pages.
Matoglu, E., et al.; "Design and Verification of Multi-Gigabit Transmission Channels Using Equalization Techniques"; Electronic Components and Technology Conference, 2005. Proceedings. 55th; May 31-Jun. 3, 2005; vol. 2; pp. 1531-1535.

* cited by examiner

*Primary Examiner* — Nghia Doan
(74) *Attorney, Agent, or Firm* — Rosenberg, Klein & Lee

(57) ABSTRACT

A method and systems are provided for screening and rapid evaluation of routed nets in a post-layout circuit environment, such as in the design of printed circuit boards. A portion of nets are selected for determination of associated signal quality factors. Signal channels containing one or more selected nets are then built. A reference input stimulus is propagated along each of the signal channels in a frequency based simulation for generating characteristic responses of the selected nets' signal channels. A signal channel quality factor is obtained for each signal channel based upon its characteristic response. The signal channels and their nets are then comparatively analyzed according to corresponding signal channel quality factors to selectively identify any aberrant nets warranting supplemental evaluation for faults.

27 Claims, 7 Drawing Sheets

| No. | (X)NET NAME | Drvr Name | Rcvr Name | SNR Value |
|---|---|---|---|---|
| 1 | AC_PET2N0 | U1 J2 | U2 H1_TEST1 U2H2_diff | 1.483 |
| 2 | AC_PET2P0 | U1 J1 | U2 H1_TEST1 U2H2_diff | 1.483 |
| 3 | AC_PET1N4 | U1 C2 | U2 B11_TEST1 U2B12_diff | 8.106 |
| 4 | AC_PET1P4 | U1 C1 | U2 B11_TEST1 U2B12_diff | 8.106 |
| 5 | AC_PER1N5 | U2 F13 | U1 G18_TEST1 U1 G19_diff | 11.361 |
| 6 | AC_PER1P5 | U2 F12 | U1 G18_TEST1 U1 G19_diff | 11.361 |
| 7 | AC_PET1N0 | U1 A2 | U2 A2_TEST1 U2 A3_diff | 11.698 |
| 8 | AC_PET1P0 | U1 A1 | U2 A2_TEST1 U2 A3_diff | 11.698 |
| 9 | AC_PER2N7 | U2 P14 | U1 R10_TEST1 U1 R11_diff | 12.488 |
| 10 | AC_PET2P7 | U2 P13 | U1 R10_TEST1 U1 R11_diff | 12.488 |
| 11 | AC_PET1N2 | U1 85 | U2 A12_TEST1 U2 R13_diff | 12.688 |
| 12 | AC_PET1P2 | U1 84 | U2A12_TEST1 U2 A13_diff | 12.688 |
| 13 | AC_PET1N4 | U2 F2 | U1 G1_TEST1 U1 G2_diff | 12.762 |
| 14 | AC_PET1P4 | U2 F1 | U1 G1_TEST1 U1 G2_diff | 12.762 |
| 15 | AC_PET1N7 | U1 D16 | U2 C13 TEST1 U2 C14_diff | 12.868 |
| 16 | AC_PET1P7 | U1 D15 | U2 C13_TEST1 U2 C14_diff | 12.868 |
| 17 | AC_PET2N4 | U1 L2 | U2 K1_ TEST1 U2 K2_diff | 12.966 |
| 18 | AC_PET2P4 | U1 L1 | U2 K1_TEST1 U2 K2_diff | 12.966 |
| 19 | AC_PET2N5 | U1 L19 | U2 K13_TEST1 U2 K14_diff | 13.106 |
| 20 | AC_PET2P5 | U1 L18 | U2 K13_TEST1 U2 K14_diff | 13.106 |
| 21 | AC_PET2N4 | U2 N12 | U1 Q1_TEST1 U1 Q2_diff | 13.425 |
| 22 | AC_PET2P4 | U2 N11 | U1 Q1_TEST1 U1 Q2_diff | 13.425 |
| 23 | AC_PET1N0 | U2 D2 | U1 E1_TEST1 U1 E2_diff | 13.564 |
| 24 | AC_PET1P0 | U2 D1 | U1 E1_TEST1 U1 E2_diff | 13.564 |
| 25 | AC_PET1P6 | U2 G3 | U1 H5_TEST1 U1 H4_diff | 13.661 |
| 26 | AC_PER1N6 | U2 G2 | U1 H5_TEST1 U1 H4_diff | 13.661 |
| 27 | AC_PET2N2 | U1 K5 | U2 J2_TEST1 U2 J3_diff | 13.705 |
| 28 | AC_PET2P2 | U1 K4 | U2 J2_TEST1 U2J3_diff | 13.705 |

FIG.9

METHOD AND SYSTEM FOR SCREENING NETS IN A POST-LAYOUT ENVIRONMENT

BACKGROUND OF THE INVENTION

1. Field of the Invention

The present invention is generally directed to a method and system for screening nets of circuit design in a post-layout environment. More specifically, the present invention is directed to a method and system operable during design verification for quickly and conveniently screening routed nets of a circuit layout, such as in a printed circuit board design, for potentially faulty nets warranting further evaluation.

2. Description of the Related Art

Typically, when a board level circuit layout has been designed (all circuit elements, including devices, discrete components, conductive traces, and the like have been placed and routed), it undergoes post-layout test/verification using a simulation tool.

The circuit layout at this stage defines a collection of nets, each forming a connection directly between circuit component pins. One or more nets are encompassed by a signal transmitting channel extending to include all passive circuit elements between a driver circuit element (which models a source for a signal) and a receiver circuit element (which models a destination for the signal). A typical circuit layout will easily include thousands of such nets, even hundreds of thousands; yet, adequate verification cannot be had without the reliable identification and remedy of individual nets having faults.

This is important for high speed circuit board applications, where point-to-point connections for transmitting signals cannot be treated simply as ideal short circuits. The distortion that signals experience during transmission between source and destination are hardly negligible in high speed applications, and individual nets of a circuit layout tend to behave much like distributed transmission lines having certain properties, each applying its own intrinsic attenuation and delay on the high speed signals passing therethrough.

For example, a signal originating with an amplitude of 5V at a driver element may arrive at the receiver with an amplitude of 4V due to signal loss through the transmission line. The signal may also be delayed during passage through the line by a non-negligible amount, say on the order of a nanosecond or so. If a high state transition voltage threshold of the receiver were 4.5V in that case, the receiver would erroneously take this signal to be of low voltage state (logic 0), though it had originated from the source as a 5V high state signal (logic 1). Consequently, the receiver would fail to recognize the intended high state signal as such (as it is below the threshold of 4.5 volts at the given point in time).

The potential for this kind of failure even in one individual net must be reliably ascertained during post-layout verification. Obviously, it is important that signals traversing the nets reach the respective receivers at their intended states, and arrive at the expected times. For certain signals, like signals on different nets of a data bus, for instance, where a byte or more of data is simultaneously sent each from multiple driving input/output (I/O) buffers, the delay factor is particularly important since all the bytes must reach the receiving end almost simultaneously. Pervasive timing problems are generated if they are out of phase. Hence, signal channel quality must be preserved for each net to guard sufficiently against the effects of noise and to maintain proper signal timing.

This presents a formidable challenge in applications where thousands of nets are presented for verification of a circuit layout, any one of which could potentially be of problematic signal channel quality. With the post-layout verification tools heretofore known, a full blown simulation analysis is performed on virtually all the nets in order to identify the problematic ones. This process is excessively complex and time consuming, and involves process-intensive simulation runs using many bits. Except in limited applications, the costs in this regard tend to be prohibitively expensive, and sufficiently expansive testing for faulty nets is often impracticable.

There is therefore a need for a method and system whereby potentially faulty, or problematic, nets of a circuit layout may be quickly and conveniently screened for without the need for comprehensive, processing-intensive, and resource-consuming simulation analysis. There is a need for such system and method by which the signal channel quality of the circuit layout's nets may be readily ascertained and compared, so that available time and resources may be committed to closer scrutiny and remedy of signal channels which are actually problematic, rather than being wasted on already acceptable signal channels.

SUMMARY OF THE INVENTION

An object of the present invention is to provide a method for screening routed nets in a post-layout circuit environment, wherein signal channels corresponding to at least a portion of the nets are characterized according to a parametric discriminant for quick and convenient identification of aberrant nets.

Another object of the present invention is to provide a system for screening routed nets in a post-layout circuit environment, wherein signal channels corresponding to at least a portion of the nets are characterized according to a parametric discriminant for quick and convenient identification of aberrant nets.

It is yet another object of the present invention to provide a method and system for rapid preliminary evaluation of nets for identification of potentially faulty nets warranting further evaluation therefrom.

These and other objects are attained by a method and system formed in accordance with the present invention. The method includes selecting a portion of nets and propagating a simulated signal through at least one signal channel containing one or more of the nets. Signal frequency components are obtained in the frequency domain over a user determined frequency range. A time domainresponse signal is generated and a signal quality factor is obtained from the time domain response. The signal quality for each signal channel is obtained, such that the nets and/or their signal channels may be selectively sorted according to user-specified criteria. The results of the signal quality simulation and sorting are displayed for rapid analysis or screening of only the selected nets.

An exemplary system embodying the method provides for a circuit-level simulator, screening unit, and display unit. The screening unit is coupled to the simulator and the display unit also couples to the simulator unit. The simulator provides the signal frequency components in the frequency domain, as well as the time domain response for each signal channel. Signal quality is calculated for each signal channel, and the screening unit then receives this information and sorts it according to user-specified criteria, for display by the display unit.

Another exemplary embodiment provides a system for rapid evaluation of the signal quality. A net selecting module and database allow selection of a portion of the nets. A field solver module is invoked to generate electrical circuit models for passive net components, and a signal channel building module generates circuit representations of the signal channels between driver and receiver circuit elements. Signals are input to each of the signal channels in a simulation process with an input signal module, and frequency components of each are obtained with a signal component control module. An input signal analysis module provides the frequency response and time domain response for each signal channel, after all frequency components of the signal have been obtained. A calculating module provides signal quality factors, which include signal to noise ratios (SNR) for each signal channel. Coupled to the calculating module is a filtering module that sorts and displays via a graphical module, the SNR results according to user-specified criteria. The criteria include sorting by the names of both driver and receiver circuit elements, the name of the selected nets and/or their corresponding signal channels, as well as the numerical magnitude of the SNR. The magnitude may also be ordered according to a threshold set by the user.

BRIEF DESCRIPTION OF THE DRAWINGS

FIG. 9 is a schematic representation of a dialog box displayed by an exemplary graphic module showing a sorted listing of signal quality factors, according to an embodiment of a method of the present invention.

DESCRIPTION OF THE PREFERRED EMBODIMENTS

Conventional methods of determining signal channel quality in high speed circuit applications include application of Time Domain Reflectometry (TDR). In TDR, signal energy is input to a system and propagated through a channel. For instance, the input may be a signal source originating from a driver component, such as an active electrical element like a transistor. The signal energy will encounter various physical discontinuities along the channel. These discontinuities may take the form of both active and passive circuit elements, physical portions of a circuit board such as vias, conductors, etc. For example, a signal may begin at a driver which may be in the form of an I/O buffer integrated within an IC, traverse its package parasitics, continue through its pin parasitics to the circuit board, then through routed net material such as a printed conductor. The signal may also pass through vias in the board between levels, then through a connector, another net, possibly another via or some other resistive element, and so on, until a pin is reached at the destination. At that point, the signal passes through the receiver's package parasitics (which may be represented by any suitable passive model), then on to the receiver.

A portion of the signal will be reflected at the discontinuities. Signal quality for the channel may then be determined by analyzing the amplitude, noise or time delay associated with the reflected (and/or transmitted) portion. These parameters of course are affected by the number and kinds of discontinuities encountered (for example, impedance mismatches). This must also be performed for each of the nets of the circuit layout. Another effect that must be accounted for is any crosstalk existing between neighboring nets.

Figure 1:
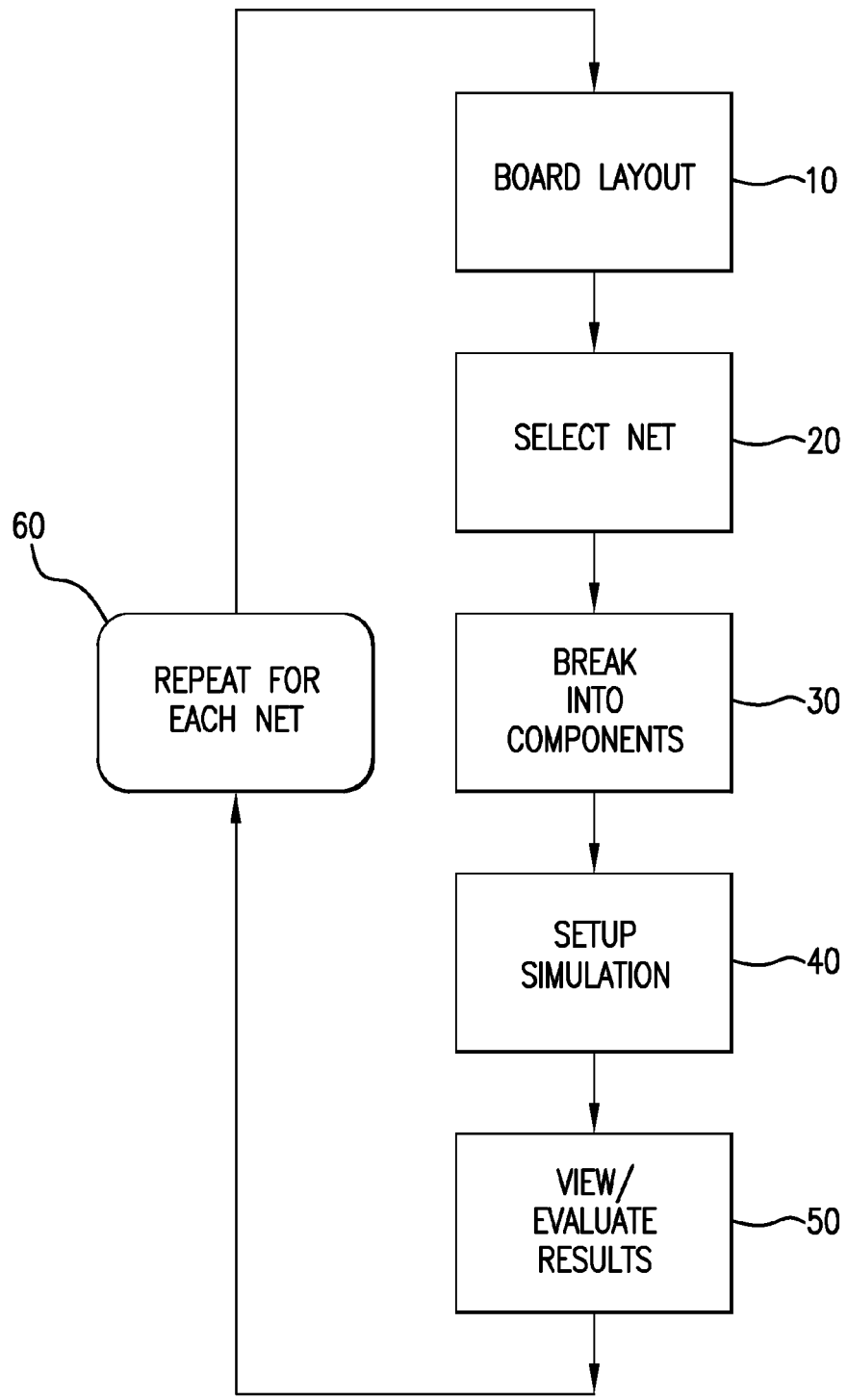
FIG. 1 is a flow diagram of prior art signal simulation.

The comprehensive process is time-consuming and complex, as shown in FIG. 1. Each channel must be prepared for signal analysis and requires a multi-million bit simulation procedure. A conventional process begins by preparing the circuit board layout at block 10. Nets are selected at block 20. At block 30, appropriate components such as vias, transmission line segments, or the like are obtained and combined with other required elements (such as connectors, discrete components, and passive elements) to model the nets and their signal transmitting channels. Simulation is set up at block 40, after which the results are produced at block 50. This sequence of steps is repeated for each net in the layout, as indicated by block 60.

Nets are generally defined as connections between components within a signal transmission channel between driver and receiver elements in a circuit layout. The driver may be constructed using active elements like a transistor. The receiver may likewise be constructed using active elements, as well as passive elements. As a signal propagates along a net, it is subject to degradation and attenuation as a result of the inherent nature of the channel (path encompassing the net(s) between the driver and receiver). This is especially pronounced in high-speed applications. As an example, a typical signal may travel from a driver, through parts of a chip, along connections to a pin, to another board perhaps by a via, into a pin connected to a chip on the other board, ultimately to a receiver. Signal quality is affected by various factors, including the bandwidth of the channel and the various elements or discontinuities encountered during propagation through the channel. The resulting signal quality at the receiver may be characterized by various parameters including amplitude, time delay, added noise and crosstalk with neighboring nets.

An analytic reference known in the art for bit simulations is one employing evaluation of an "Eye Diagram." These diagrams are known in the art and typically include simulation of bit patterns associated with a signal as it traverses a channel or net. Various bit sequences are overlaid in constructing the diagram. The "eye" can be characterized by measuring rise and fall times, jitter, and numerous other characteristics of the bit patterns. The overall analysis provides a measure of the bandwidth quality of the channel, though logic or protocol issues will not be revealed. In other words, the diagram will indicate only channel problems, not whether a faulty signal was propagated in the first place.

In order to obtain a useful diagram, a multi-million bit simulation is usually necessary. For a typical circuit with thousand of nets, this simulation procedure consumes excessive time and vital computer and other resources. Additionally, the simulation procedures will provide signal quality characteristics even for those channels which do not include significant problems.

Not surprisingly, multi-million bit time domain simulations are problematic in circuit layouts with thousands of nets.

Each net must be prepared and a simulation performed for each, potentially requiring analysis of signal parameters for all nets.

Figure 2:
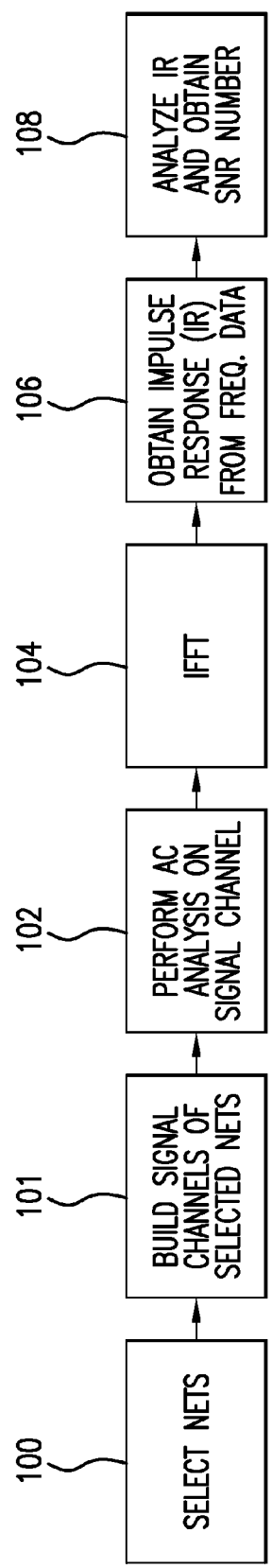
FIG. 2 is a schematic diagram of a method for screening routed nets in a post-layout circuit environment, in accordance with one embodiment of the present invention.

Referring now to FIG. 2, there is shown a schematic diagram illustrating a post layout flow of operations in accordance with an exemplary embodiment of the present invention. Briefly, the overall operation of the present method and system is as follows:

Once a circuit has been designed, and its various components placed and routed in a suitable manner known in the art, the resulting circuit layout is defined by a plurality of circuit elements interconnected at respective nodes by a plurality of nets. It is important at the post-layout stage to test, among other things, the nets of the circuit layout for their ability to convey a signal without unduly diminishing the signal's quality. For example, one or more nets are defined within a signal 'channel' extending between certain 'driver' and 'receiver' nodes. The resulting signal channel may include numerous transitions or discontinuities at and between electrical elements which provide points of potential signal degradation. When a signal channel and its constituent net(s) fail to sufficiently preserve signal quality (exhibit poor channel quality), significant consequences, such as undetected logic levels, may obviously occur.

The full set of a circuit layout's nets may be systematically evaluated by simulation-based testing tediously applied to each individual net to identify ones that are faulty. This often proves prohibitively expensive, however, in terms of time, processing power, and general consumption of limited system resources. In accordance with one aspect of the present invention, the circuit layout's nets may be subjected—preferably, a selected portion at a time—to a relatively quick and convenient screening whereby potentially faulty or problematic nets may be identified for more extensive further evaluation and correction, if necessary. The correction may entail adjustment of the circuit design by suitably rerouting faulty nets, changing impedance parameters, changing input/output buffers, or the like.

In this way, the more extensive evaluation required for full test and verification is reserved only for those nets identified by the screening to be sufficiently suspect. The screening itself is conducted in a more streamlined manner, preferably by characterizing each of the signal channels to which the nets under consideration belong according to its simulated response to a common input signal. The characterization provides a preliminary indication of signal channel quality achieved with the selected nets, by which to quickly rank the nets' channels and selectively discriminate troublesome nets from healthy ones.

Preferably, the nets' signal channels are each modeled by suitable means in the given simulation system as individual circuits having driver and receiver elements connected by a signal transmitting channel extending therebetween. The resulting circuit models are individually subjected in simulation to the same signal input—impulse signal input, for example—to obtain their characteristic impulse responses. The individual impulse responses are then evaluated by a screening engine for one or more parametric discriminants, such as signal to noise ratio (SNR), so that the signal channels containing nets exhibiting aberrant impulse responses may be easily identified. Nets identified in this manner are preferably flagged for further, more comprehensive analysis of their signal channel quality.

Turning to FIG. 2, the full collection of nets of the given circuit layout is initially established. Only a portion of the nets need be selected for consideration at block 100, in order to engage in a quick diagnostic analysis of potential signal quality issues associated with the selected nets possibly necessitating subsequent in-depth simulations. The selection of various nets for consideration may be made by any suitable means known in the art, for example in conjunction with use of a graphical user interface. The selection may be made based upon any criteria appropriate for the specific requirements of the intended application. For instance, those nets going to a certain part of a circuit board may be of interest, or those nets having certain common features may be of interest.

In any event, the selected nets are provided as inputs to the screening engine. Signal transmitting channels corresponding to the selected nets are built at block 101, with each signal transmitting channel encompassing one or more nets. For each signal transmitting channel, an isolated circuit from the driver to the receiver is modeled for screening analysis, preferably by the simulation system employed. The modeled circuit is effectively built and simulated thereby to include any and all parts of the given net(s) for the analysis.

In accordance with an embodiment of the present invention, various net components such as vias, transmission line segments, and the like are extracted from a layout database that contains physical information (lengths and widths of segment cross sections, dielectric constants of board dielectric layers, conductivity of traces, and the like). Preferably, active elements (such as I/O buffers and the like) and discrete elements within a signal channel (such as capacitors, resistors, and the like) are extracted from a component model library containing circuit models, while a field solver is invoked to generate electrical circuit models for the passive net components (i.e., via, transmission line segment).

Once the effective circuit from the driver to the receiver is modeled, the circuit is passed to the simulation system for AC analysis. The circuit model preferably includes corresponding stimulus information (for example, sweep information like start and end frequencies) to be applied to a driving I/O node by the simulation. The simulation system is preferably actuated to simulate in the frequency domain, as frequency domain analysis generally provides considerable savings in time and resource consumption over comparable time domain analysis.

Any suitable simulation capability known in the art may be employed in this regard. Depending on the particular requirements of the intended application, the simulation capability may be invoked using an automated post-layout tool of a suitable type known in the art.

Figure 3:
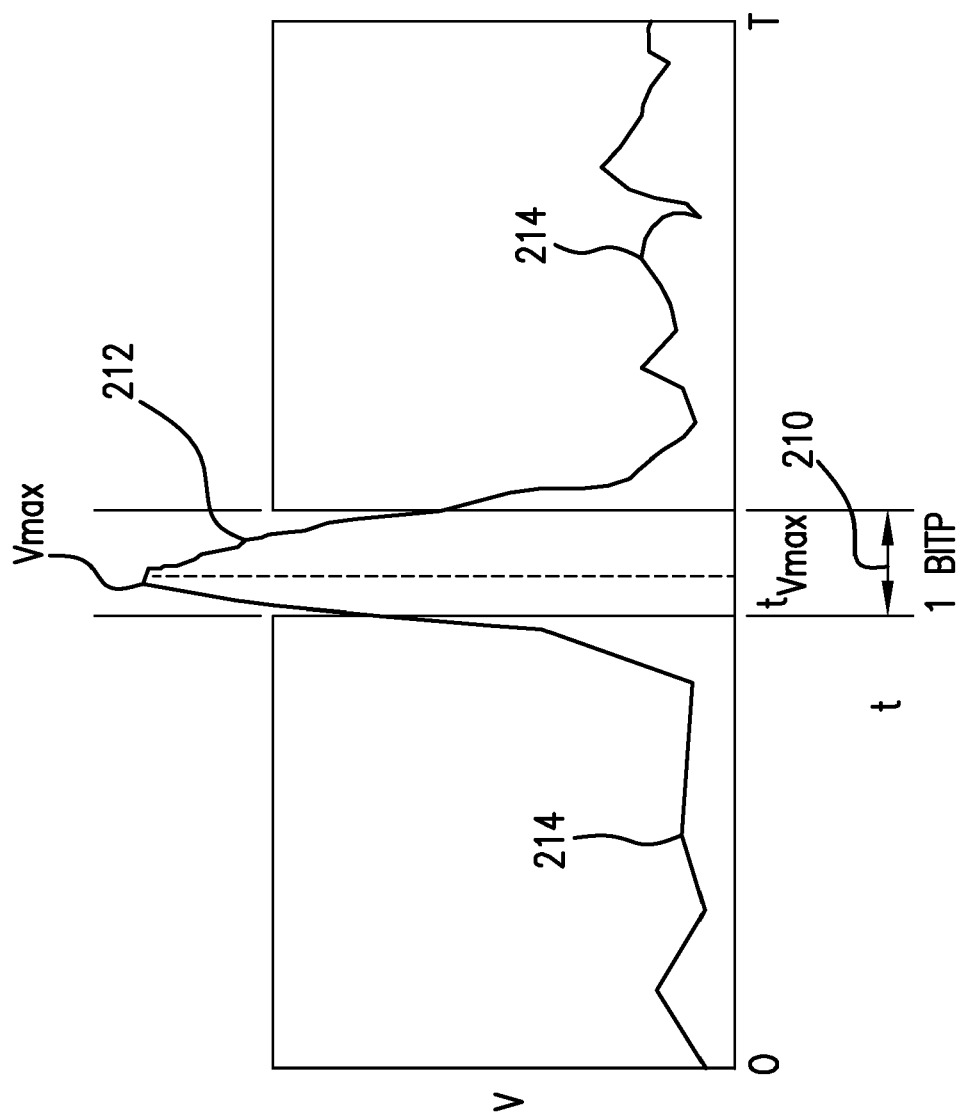
FIG. 3 illustrates an exemplary time domain response signal.

At block 102, a predetermined input signal, such as an AC or sinusoidal signal, is input to the driver of each signal transmission channel and propagated by simulation along the modeled signal transmission channel to the receiver. In the exemplary embodiment shown, the signal channels of the nets under consideration are characterized by their simulated responses to a unit impulse signal input. That is, a very short impulse is applied to each net's signal transmitting channel, and responsive behavior over the channel is characterized. FIG. 3 illustrates by way of example a time domain representation of an impulse response waveform in one signal channel. The waveform illustrates the distortion that an ideal rectangular impulse signal input would effectively undergo in traversing the channel.

A notable attribute of a unit impulse response is that it effectively characterizes a transfer function for the given signal channel. As such, each channel's response to any particular input signal may be obtained by convolving that particular input signal with the channel's impulse response.

Regardless of the actual input signal employed, a plurality of frequency components for the output signal is obtained by simulating each channel's response preferably to a frequency-swept series of input signal components. For example, a simulation run for each signal channel may be iteratively executed a predetermined number of times, such as 4000 times, using frequencies progressively stepped for each run over a predetermined bandwidth, such as 0 to 20 GHz. A meaningful representation of the channel's frequency response is acquired in this manner over a set of such iterative simulation runs. Factors such as the number of simulation runs required for sufficiently meaningful acquisition and the bandwidth over which the frequency is swept will depend on the particular requirements of the intended application.

This frequency-based approach generally requires fewer samples than a time domain technique. Even at iterations on the order of 4000, the computational load and required processing time for the approach pale in comparison (typically by orders of magnitude) to the load and time required for meaningful time domain simulation encompassing millions of bits.

After the results of all the signal components' simulated propagation along a signal channel of one or more selected nets have been obtained in the frequency domain, the associated frequency response for the channel may be determined by any suitable technique known in the art. A time domain impulse response signal is then generated from the frequency response at block 104 by a suitable method known in the art, for instance via Fourier Transform techniques like Inverse Fast Fourier Transform (IFFT). The time domain impulse representation thus obtained at block 106 is then processed at block 108 to obtain one or more parametric discriminants for quickly discriminating signal channels having nets tending to exhibit abnormal impulse response.

The particular type(s) of parametric discriminant employed will depend on the specific requirements of the intended application. In accordance with one aspect of the present invention, each parametric discriminant employed serves as measurable indicia of a signal channel's capacity (relative to certain predefined standard(s)) to transmit a signal without undue detrimental effect.

Preferably in the embodiment shown, a signal to noise ratio (SNR) discriminant is generated for each of the selected nets' signal channels from analysis of its impulse response. As an example, the SNR discriminant may be calculated at block 108 by forming the ratio of signal energy of the time domain impulse response waveform to the noise energy, or the difference between the total energy and the signal energy. Referring to FIG. 3, an exemplary impulse response waveform is illustrated, with the signal portion 212 (having a voltage peak P) accompanied by the noise 214 which results from simulated propagation along the corresponding net's signal channel. Noise may result from various sources, including crosstalk with neighboring nets as well as contributions arising from channel components. In an exemplary embodiment, the signal and total energy are preferably calculated as follows:

$$\text{Signal energy} = \sum_{t=t_{vmax}-bitp/2}^{t=t_{vmax}+bitp/2} (V_t - V_0)^2$$

and $$\text{Total energy} = \sum_{t=0}^{t=T} (V_t - V_0)^2$$

The value "bitp" is a bit period 210 (derived as the inverse of a predetermined pulse clock frequency employed in the given application) corresponding to the response signal, "$t_{Vmax}$" is the time corresponding to $V_{max}$, where $V_{max}$ is a maximum voltage of the response signal, $V_t$ is a voltage variable corresponding to a time "t," and "T" the time duration over which the response signal is measured. $V_0$ is the voltage value at time t=0.

After the SNR discriminant values are calculated to characterize the signal channels under consideration, the operation at block 108 preferably includes the selective sorting or filtering of the characterized signal channels and their nets according to various user-specified criteria. These may include, but are not limited to, sorting corresponding to the name of a driver for a selected net, the name of a receiver, the name of the selected net itself (or its signal channel), as well as the numerical magnitude of the calculated signal quality factor. The latter may also be sorted accordingly if it exceeds a threshold value set by the user. Once the signal quality factors have been sorted according to user specifications, they may be displayed similarly by suitable means such as with a graphical user interface. The calculation of characteristic SNR discriminants, combined with the sorting and display, provide a rapid method for a user to screen and comparatively view the routed nets selected for consideration.

This yields a quickfire preliminary approach for determination of signal channel quality for a selection of nets that dispenses with the need for an initial full-blown analysis of all nets in the circuit. The quick diagnosis of signal channel quality for a portion of the nets may reveal potential channel problems, or alternatively indicate the absence of any problems. In the case of the former, the subject method and system allow for redesign of the circuit and/or the nets, in a quicker time frame. For instance, once a list of SNR values has been calculated and displayed (as illustrated for instance in FIG. 9), the user or designer may immediately identify nets whose signal channels have the highest and lowest SNR values. The user may then concentrate on only those nets with low corresponding SNR values or fall below a pre-determined threshold, for subsequent analysis or re-design. Nets having a sufficiently high corresponding SNR value, above a threshold, or meeting some other user-defined criterion, need not be examined, thus saving time and unnecessary further processing. The actual SNR threshold level or other criteria employed for delineating acceptable nets from potentially faulty nets will depend on the particular requirements of the intended application.

Figure 4:
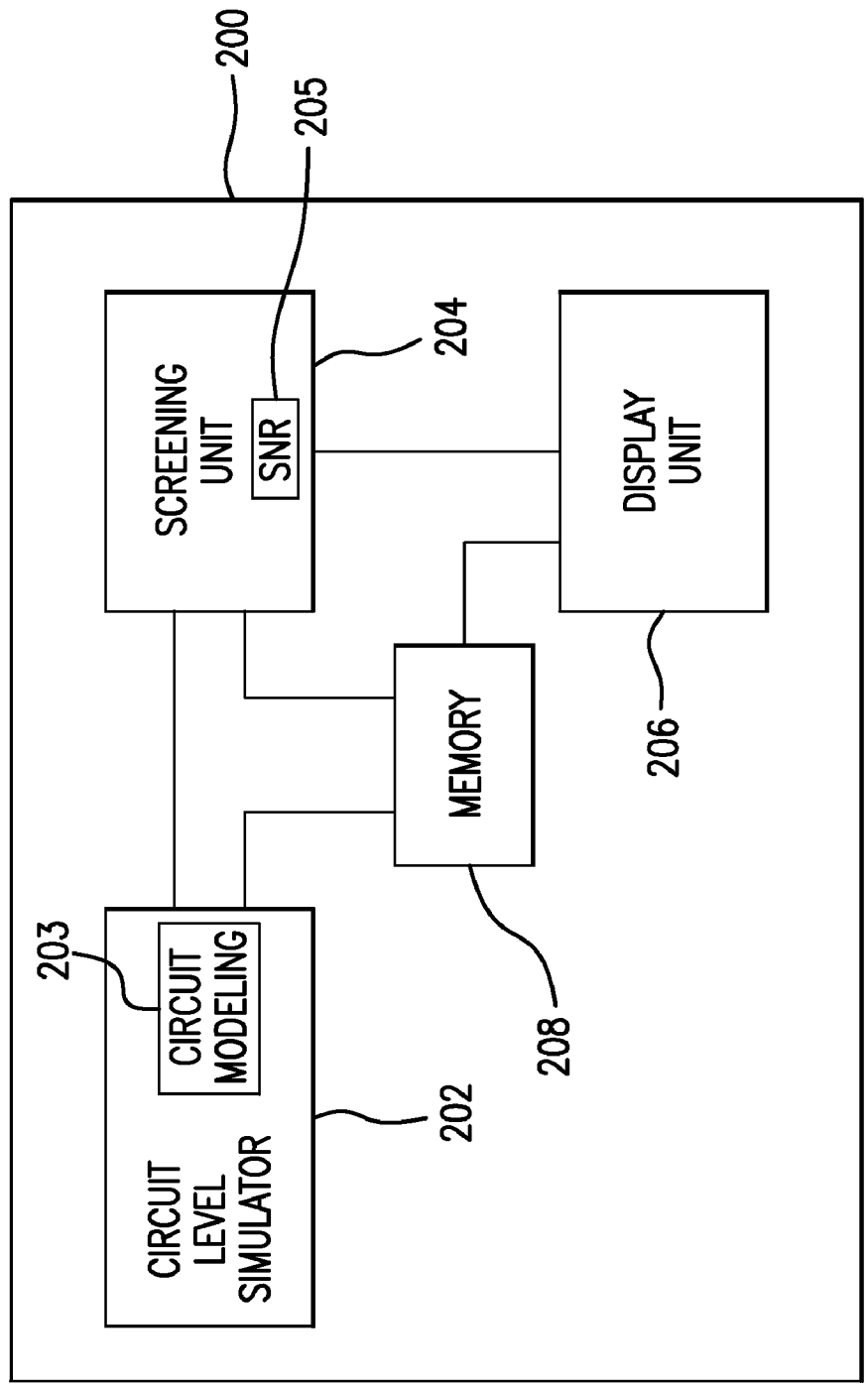
FIG. 4 is a block diagram of a system for acquiring and screening signal quality of nets in accordance with once embodiment of the present invention.

Referring now to FIG. 4, there is shown a block diagram illustrating the interconnection of certain functional components in an exemplary embodiment of a system 200 formed in accordance with embodiments of the present invention. A circuit-level simulator 202 is operably coupled to a screening unit 204. Preferably, the simulator and screening unit 202 and 204 are programmably implemented in one or more microprocessor based platforms of any suitable type known in the art. A display unit 206, preferably equipped with responsive means to generate a graphic user interface, is operably coupled to the screening unit 204. A collective memory unit 208 storing the pertinent data is available for access as necessary by each of the units 202, 204, 206. While the memory unit is separately shown for illustrative purposes distinct and apart from the units 202, 204, 206, it will be apparent to one skilled in the art that such may be implemented in any suitable manner to be either integrated with or separately disposed relative to one or more of those units. In this regard, pertinent data may be directly saved and accessed for example in RAM or hard disk storage, or saved alternatively in suitable data files.

The simulator unit 202 may be implemented as a stand alone simulation engine or as part of a larger circuit analysis system. The simulator unit 202 preferably includes a circuit modeling tool 203 which receives the nets selected by the screening unit 204 for consideration and builds equivalent circuit models for the signal channels corresponding thereto. When actuated responsive to the screening unit 204, the simulator unit 202 applies a predefined input signal to each of the resulting signal channels' circuit models, as described in preceding paragraphs. The applied input signal is suitably simulated to propagate from a driver of each signal channel, on through the signal channel itself to the corresponding receiver. The simulator unit 202 is preferably actuated to perform the frequency sweeping analysis through the particular bandwidth of interest, as described in preceding paragraphs. This frequency-swept analysis produces a plurality of signal frequency components which are suitably combined to yield a frequency response for each signal channel of the selected nets. The frequency response is preferably provided to the screening unit 204 for conversion to a time domain representation using known techniques, such as Fourier analysis. A discriminant processing tool 205 operates on the time domain representation of the response signal to calculate a characterizing discriminant value for each signal channel. The screening unit 204 preferably sorts the characterized signal channels and its net(s) according to predetermined user criteria, then displays them accordingly through the display unit 206.

Figure 5:
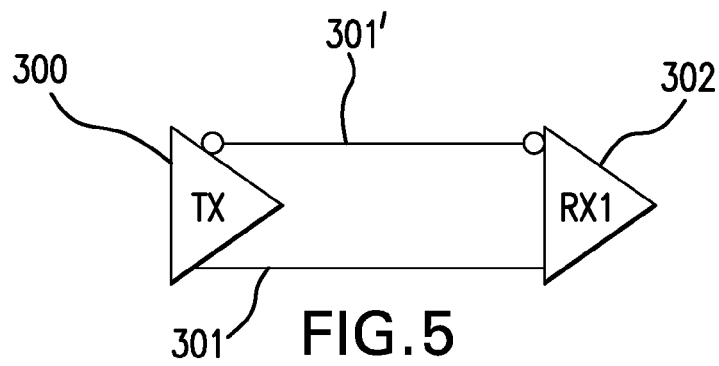
FIG. 5 is a schematic diagram of nets connected between a driver/receiver pair.

An example of a driver and receiver interconnected by a net of single-ended complementary pair type are schematically illustrated in FIG. 5. Such a single-ended driver/receiver differential pair 300/302 is shown actually connected by two nets 301, 301'. In such arrangement, complementary signals are transmitted along the nets, as a means of reducing or eliminating noise contributions to the simulated signal. That is, the signal complements may be subtracted to yield a stronger, more discernible signal output at the receiver, while at the same time noise contributions, which are non-complementary, random, and present in substantially equivalent measure on both nets 301/301', are also subtracted to mutually cancel. Such technique is employed in the art to alleviate various issues associated with circuit noise present in transmission lines at high speed applications.

Figure 6:
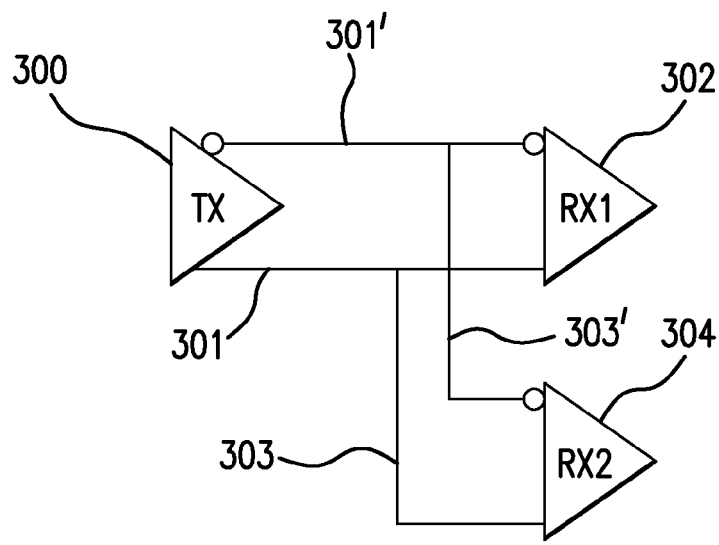
FIG. 6 is a schematic diagram of nets connected between a driver and multiple receivers.
Figure 7:
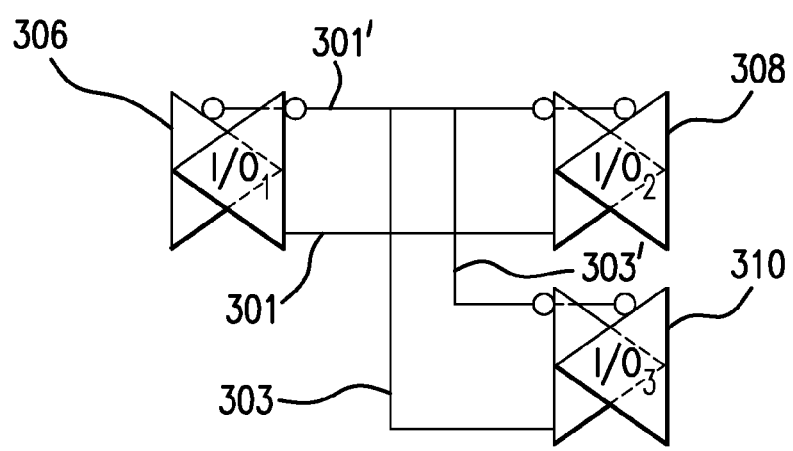
FIG. 7 is a schematic diagram of nets connected between multiple drivers and multiple receivers, where each driver and receiver serves dual functions depending on the direction of signal propagation through the nets.

FIG. 6 illustrates a single-ended multiple driver/receiver pair, in which there are multiple receivers 302/304 associated with a singular driver 300. Here again, complementary simulated signals are placed at the driver of the selected nets and propagated in the aforementioned process. This case contemplates the same signal at a given driver 300 being propagated over different nets 301/301', 303/303' to different end point receivers 302, 304. FIG. 7 shows an embodiment where circuit elements have dual roles—as drivers during certain modes of operation, and as receivers in other modes of operation. Thus, multiple drivers 306, 308, 310, as well as multiple receivers 306, 308, 310 are provided. In this exemplary configuration, the dual receiver and driver functions are denoted by the overlapped, reversed symbols at each of the elements 306, 308, and 310. The signal present at a receiver that also acts as a driver may then be further propagated along the channel/net from that "receiver" ultimately to an end point receiver of the selected net.

The driver may be an active circuit element, such as a transistor. The driver may also be simulated with respect to a behavioral level model, such as with gate-level logic, in addition to a transistor level model. Such behavioral I/O models as IBIS (I/O Buffer Information Specification) I/O models may be employed, which preserve compatibility with transistors, chips, and input/output devices. Drivers may additionally include other signal sources.

Receivers, while usually passive elements like capacitors or resistors, may also be modeled as active elements as described above, especially as illustrated in FIG. 7. Table 1 lists the possible driver/receiver pairs corresponding to FIG. 7.

TABLE 1

| Driver | Receiver |
| --- | --- |
| $I/O_1$ | $I/O_2$ |
| $I/O_1$ | $I/O_3$ |
| $I/O_2$ | $I/O_1$ |
| $I/O_2$ | $I/O_3$ |
| $I/O_3$ | $I/O_1$ |
| $I/O_3$ | $I/O_2$ |

For the differential pair configurations depicted in FIG. 5-7, input stimulus need only be applied in simulation to one of the nets in any complementary pair, though both nets are screened for. By design, the characteristic response to the same stimulus should effectively be the same in complementary net. The number of SNR or other parametric discriminant values calculated for each differential net preferably corresponds just to the number of its effective driver/receiver pairs. For instance, since there are six driver/receiver pairs shown in FIG. 7 and Table I, there would be six corresponding discriminant values calculated, sorted, and displayed. Although differential driver/receiver layouts are depicted in FIG. 5-7, the screening of non-differential driver/receiver pairs having a single net connecting the driver and receiver are within the scope of the present invention.

The signal transmitting channels in the examples illustrated in FIGS. 5-7 are each shown to include a single net in each signal propagating direction. It is to be understood, however, that such signal transmitting channels may in alternate embodiments include multiple nets defined along any of their signal propagating directions.

Figure 8:
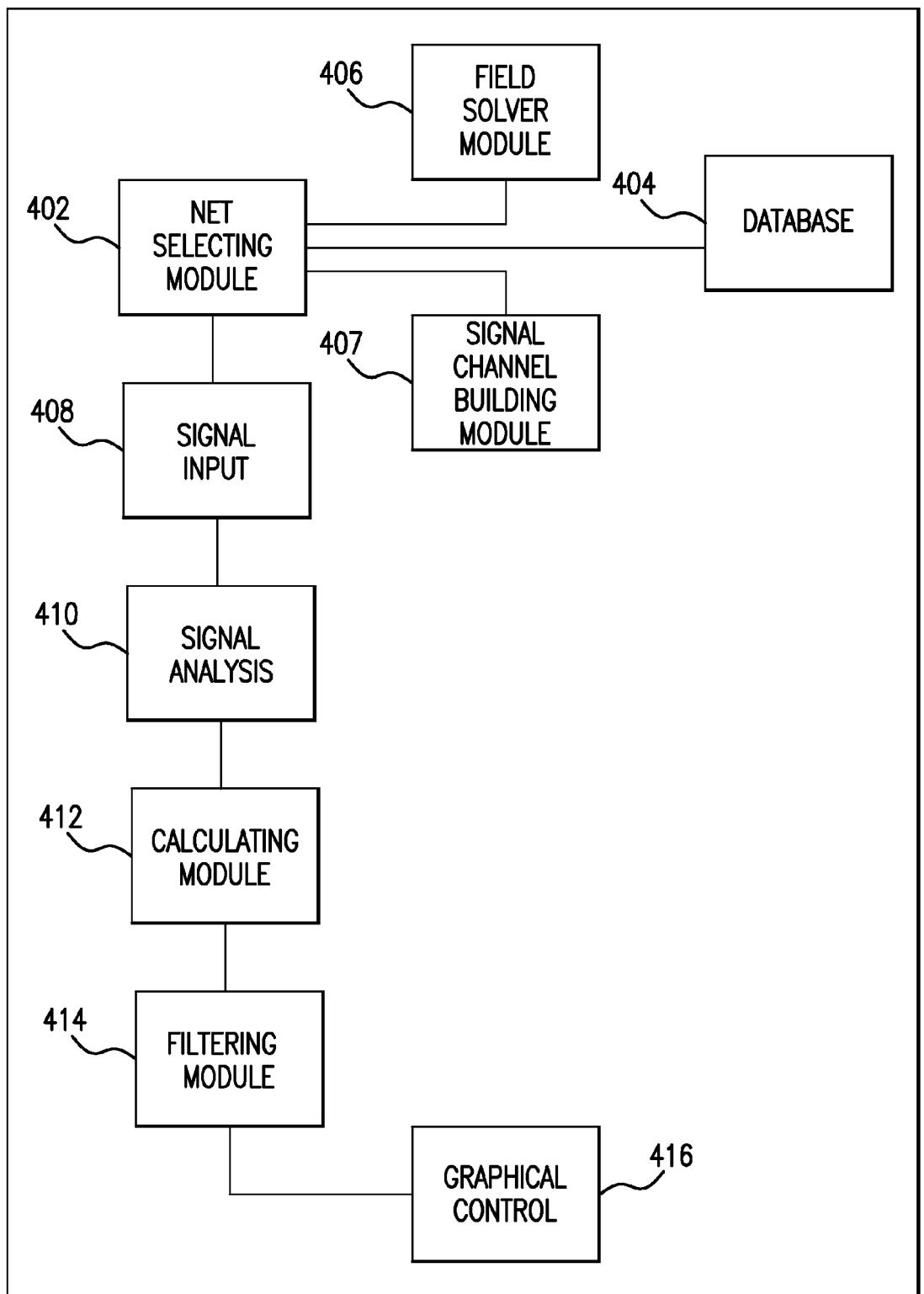
FIG. 8 is a block diagram of a system for rapid evaluation of a plurality of nets in accordance with one embodiment of the present invention.

In accordance with another aspect of the present invention, a system 400 for rapid evaluation of nets in a circuit layout is presented. FIG. 8 illustrates a block diagram of but one exemplary embodiment of the system. Initially, a net selecting module 402 of the system enables a user to select only those nets of the circuit layout which may be of interest for design or testing purposes. The nets are defined relative to a signal channel extending between at least one pair of driver and receiver elements. A database 404 coupled to the net selecting module 402 contains information corresponding to each net. A field solver module 406 preferably models the passive components of the selected nets, including any vias, transmission line segments, power planes, or the like. This modeling suitably accounts for the particular manner in which a signal will interact with any encountered element or discontinuity along the channel of the net.

A signal channel building module 407 uses the modeled components in combination with any active elements and discrete elements to formulate circuits effectively modeling the corresponding signal channels encompassing one or more of the selected nets. Preferably, the active and discrete elements are extracted if necessary from a component model library maintained in the database 404.

A signal input module 408 enables simulated signals to be input to the signal channels of the nets selected by the net selecting module 402. These correspond to the signals input to the driver in FIG. 5-7. Signal frequency components of the simulated signals are obtained by a signal component control module (not shown) included in an input module. These components include the signals whose frequencies have been incremented at block 102 in FIG. 2. An input signal analysis module 410, which is coupled to the signal input module 408, produces the frequency response to the input signals after all of the response signal frequency components have been obtained by the signal component control module. Using known techniques such as Fourier analysis (as illustrated, for example, at block 104 of FIG. 2), a time domain response signal corresponding to the frequency response will also be produced from the analysis module 410 for each of the selected nets' signal channels.

Once the respective response signals have been obtained for each signal channel, a calculating module 412 ultimately calculates the parametric discriminant values (or signal quality factor), such as signal to noise ratios (SNR), for each of the signal channels, based on the time domain response signal (as illustrated, for example, at block 108 of FIG. 2). The results of these calculations are then filtered by a filtering module 414 according to user criteria and displayed accordingly via the graphical control module 416. Depending on the criteria, sorting and displaying may be conducted according to the names of selected nets and/or their signal channels, names of drivers, names of receivers, numerical magnitudes of the signal quality factor, or the like.

FIG. 9 illustrates a graphic display of an exemplary table 500 containing sorted signal quality factors displayed by the graphical module 416. In the figure, 28 individual signal channels of the nets are displayed, however, the number will obviously vary according to user selection and preference. Fields in the table 500 may include signal channel name 502 (each signal channel expressed in the example shown as an extended net, "(X)Net"), driver name 504, receiver name 506, and characteristic signal to noise ratio (SNR) value 508 ranked from smallest to largest. Additionally, the results may be saved and recalled and re-sorted as desired by the user.

FIG. 9 also illustrates the efficiency with which signal quality may be clearly displayed for a user. The present method and system enable a designer to quickly ascertain from the display vital information about signal transmitting channel quality for any number of nets. In accordance with an aspect of the present invention, a user may do so without the need for an overly complex, traditional analysis in which all nets must be comprehensively evaluated. For instance, the presented method and system yield, among other things, a tabulated list of SNR values. The designer may preliminarily utilize these values for quick diagnosis of the circuit layout, saving the more complete evaluation of time delay or phase difference implications for only those nets found by the preliminary diagnosis to be of concern. While such preliminary diagnosis may be made by a user manually, it may in certain embodiments be made in partial or wholly automated manner.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation flows or processing steps may be reversed or interposed, all without departing from the spirit or scope of the invention as defined in the appended claims.

What is claimed is:

1. A method for screening routed nets of a circuit layout for potential faults comprising:
   establishing a plurality of nets defined for the layout selecting at least a subset of the nets;
   modeling a plurality of signal channels as signal propagating circuits, each signal channel including at least one of the selected nets;
   actuating a processor to characterize a signal channel quality for each of the signal channels, wherein a predetermined input stimulus is commonly applied to each of the modeled signal propagating circuits to capture a characteristic response, at least one parametric discriminant indicative of the signal channel quality being generated for each of the signal channels based upon the characteristic response thereof; and
   evaluating the selected nets according to the signal channel quality characterized therefor to selectively identify an aberrant net warranting supplemental evaluation.

2. The method as recited in claim 1, wherein the input stimulus is applied to each of the modeled signal propagating circuits in a frequency-domain simulation executed in frequency swept manner, the input stimulus including a plurality of signal components separated one from the other in frequency.

3. The method as recited in claim 2, wherein the input signal components of the input stimulus are separated in frequency by a predefined frequency step over a predetermined bandwidth, a plurality of response components responsively generated by the frequency-domain simulation being acquired and combined to form a collective frequency response for each of the signal channels, the characteristic response being derived in the time domain based on the frequency response.

4. The method as recited in claim 2, wherein the characteristic response of each signal channel includes an impulse response.

5. The method as recited in claim 1, wherein the parametric discriminant generated for each of the signal channels includes a signal-to-noise ratio (SNR) factor obtained from the characteristic response thereof.

6. The method as recited in claim 5, wherein the SNR factor for each of the signal channels is defined according to a signal energy component and a total energy component derived from the characteristic response signal thereof, the SNR factor including a ratio of the signal energy component relative to a difference between the total energy and signal energy components, wherein:

$$\text{Signal energy} = \sum_{t=t_{vmax}-bitp/2}^{t=t_{vmax}+bitp/2} (V_t - V_0)^2$$

and $$\text{Total energy} = \sum_{t=0}^{t=T} (V_t - V_0)^2$$

wherein bitp denotes a predefined bit period corresponding to the characteristic response, $t_{Vmax}$ denotes a time value corresponding to a peak voltage $V_{max}$ of the characteristic response, $V_t$ denotes a variable voltage value corresponding to a variable time value t, T denotes an elapsed time period covered by the characteristic response, and $V_0$ denotes a voltage value at time t=0.

7. The method as recited in claim 1, wherein the nets of the signal channels characterized for signal channel quality are visually displayed on a graphic user interface.

8. A method for screening routed nets of a circuit layout comprising:
    establishing a plurality of nets defined for the layout;
    selecting at least a subset of said nets executed in a processor, said screening analysis including:
        defining at least one signal channel each including at least one of said nets selected for screening analysis;
        simulating propagation of a predetermined reference input signal through each said signal channel;
        acquiring a frequency domain response signal responsive to said simulated propagation;
        obtaining a time domain characteristic response signal corresponding to said frequency domain response signal for each said signal channel;
        generating for each said signal channel at least one signal channel quality factor parametrically determined from said characteristic response signal thereof;
        selectively sorting and displaying said signal channel quality factors according to at least one predefined criteria; and
        evaluating said signal channels according to said signal channel quality factors to selectively identify an aberrant net warranting supplemental evaluation.

9. The method as recited in claim 8, wherein said screening analysis includes modeling each of said signal channels as a signal propagating circuit for simulating propagation of said reference input signal therethrough, said signal propagating circuit including a plurality of electrical circuit elements connected to transmit a signal between a driver component and a receiver component.

10. The method as recited in claim 9, wherein said reference input signal is defined by a plurality of input signal components separated one from the other in frequency, said input signal components being iteratively applied in frequency swept manner to said modeled signal propagating circuit of each said signal channel over a plurality of simulation runs.

11. The method as recited in claim 10, wherein said input signal components of said reference input signal are separated in frequency by a predefined frequency step over a predetermined bandwidth, a plurality of response signal components responsively generated by said simulation runs being combined to collective form said frequency domain response signal for each said signal channel.

12. The method as recited in claim 8, wherein said signal channel quality factor includes a signal to noise ratio (SNR) defined by a signal energy of said characteristic response signal relative to a difference between a total energy and said signal energy of said characteristic response signal, wherein:

$$\text{Signal energy} = \sum_{t=t_{vmax}-bitp/2}^{t=t_{vmax}+bitp/2} (V_t - V_0)^2$$

and $$\text{Total energy} = \sum_{t=0}^{t=T} (V_t - V_0)^2$$

wherein bitp denotes a predefined bit period corresponding to said characteristic response signal, $t_{vmax}$ denotes a time value corresponding to a peak voltage $V_{max}$ of the characteristic response, $V_t$ denotes a variable voltage value corresponding to a variable time value t, T denotes an elapsed time period covered by the characteristic response, and $V_0$ denotes a voltage value at time t=0.

13. The method as recited in claim 12, wherein said characteristic response signal of each said signal channel includes an impulse response signal.

14. The method as recited in claim 8, wherein said signal channels are displayed for said comparative evaluation in ranked manner according to said signal channel quality factors thereof.

15. A system for screening routed nets of a circuit layout for potential faults comprising:
    a screening unit operable to select a plurality of routed nets for screening analysis, the screening unit characterizing based upon at least one parametric discriminant a signal channel quality for each signal channel of the circuit layout corresponding to the selected nets;
    a circuit-level simulator coupled to the screening unit, the circuit-level simulator being operable responsive to said screening unit to apply a predetermined input stimulus to respective signal propagating circuit models for a plurality of the signal channels, the circuit-level simulator being operable to capture in memory a characteristic response to the input stimulus of the signal propagating circuit for each signal channel, the parametric discriminant being derived by the screening unit for each signal channel from the characteristic response thereof; and
    a user interface unit coupled to the screening unit for displaying the selected nets according to the characteristic signal channel quality corresponding thereto for evaluation, whereby an aberrant net warranting supplemental evaluation is selectively identified.

16. The system as recited in claim 15, wherein the circuit-level simulator includes a circuit modeling unit for modeling each signal channel to generate the signal propagating circuit therefor.

17. The system as recited in claim 15, wherein the screening unit includes a parametric discriminant evaluation module configured to obtain a signal-to-noise ratio (SNR) factor for each signal channel from the characteristic response thereof.

18. The system as recited in claim 17, wherein the circuit-level simulator is actuated to generate a characteristic response of each signal channel to include an impulse response.

19. The system as recited in claim 17, wherein said signal input module further comprises a signal component control module for obtaining a plurality of signal components corresponding to said reference input signal, wherein each of said plurality of signal components is obtained in the frequency domain; said plurality of signal components being incremented in frequency according to a user specification.

20. The system as recited in claim 19, wherein said input signal analysis module generates at least:
    a frequency response corresponding to said plurality of signal components for each of said signal channels; and a signal response in the time domain corresponding to said frequency response for each of said signal channels.

21. The system as recited in claim 20 wherein said signal quality factor for each said signal channel includes a signal to noise ratio (SNR) component derived from said signal response of said signal channel.

22. The system as recited in claim 21, wherein said filtering module is operable to selectively sort said signal quality factors according to user-specified criteria for display by said graphical user module.

23. A system for rapid evaluation of a plurality of nets in a circuit layout for faults comprising:
  a net selecting module operable to select a plurality of nets from the circuit layout;
  a database coupled to said net selecting module storing data corresponding to each of said plurality of nets;
  a field solver module coupled to said net selecting module operable to model a plurality of circuit elements along each of said plurality of nets;
  a signal channel building module coupled to the net selecting module operable to generate a plurality of signal propagating circuits modeling a plurality of signal channels of the circuit layout, said signal propagating circuits each including said modeled circuit elements of at least one of said selected nets;
  a signal input module coupled to said net selecting module, said signal input module commonly applying in simulation a predetermined reference input signal to said signal propagating circuits generated by said signal channel building module;
  an input signal analysis module coupled to said signal input module;
  a calculating module coupled to said input signal analysis module for calculating a plurality of signal quality factors for said signal channels;
  a filtering module coupled to said calculating module; and
  a graphical control module coupled to said filtering module.

24. A computer program product for screening routed nets of a circuit layout for potential faults, the computer program product comprising a non-transitory computer usable medium having program instructions for:
  establishing a plurality of nets defined for the layout;
  selecting at least a subset of the nets;
  modeling a plurality of signal channels as signal propagating circuits, each signal channel including at least one of the selected nets;
  characterizing a signal channel quality for each of the signal channels, wherein a predetermined input stimulus is commonly applied to the plurality of modeled signal propagating circuits to capture a characteristic response, at least one parametric discriminant indicative of the signal channel quality being generated for each of the signal channels based upon the characteristic response thereof; and
  evaluating the selected nets according to the signal channel quality characterized therefor to selectively identify an aberrant net warranting supplemental evaluation.

25. The computer program product as recited in claim 24, wherein the input stimulus is applied to each of the modeled signal propagating circuits in a frequency-domain simulation executed in frequency swept manner, the input stimulus including a plurality of signal components separated one from the other in frequency by a predefined frequency step over a predetermined bandwidth, a plurality of response components responsively generated by the frequency-domain simulation being acquired and combined to form a collective frequency response for each of the signal channels, the characteristic response being derived in the time domain based on the frequency response.

26. The computer program product as recited in claim 25, wherein the characteristic response of each signal channel includes an impulse response.

27. The computer program product as recited in claim 26, wherein the parametric discriminant generated for each of the signal channels includes a signal-to-noise ratio (SNR) factor obtained from the characteristic response thereof, wherein the SNR factor for each of the signal channels is defined according to a signal energy component and a total energy component derived from the characteristic response signal thereof, the SNR factor including a ratio of the signal energy component relative to a difference between the total energy and signal energy components, wherein:

$$\text{Signal energy} = \sum_{t=t_{vmax}-bitp/2}^{t=t_{vmax}+bitp/2} (V_t - V_0)^2$$

and $$\text{Total energy} = \sum_{t=0}^{t=T} (V_t - V_0)^2$$

wherein bitp denotes a predefined bit period corresponding to the characteristic response, $t_{V_{max}}$ denotes a time value corresponding to a peak voltage $V_{max}$ of the characteristic response, $V_t$ denotes a variable voltage value corresponding to a variable time value t, T denotes an elapsed time period covered by the characteristic response, and $V_0$ denotes a voltage value at time t=0.

* * * * *